May 22, 1923.
H. R. WARREN
SPRING FOR AUTOMOBILES
Filed Aug. 19, 1921.
1,456,410
2 Sheets-Sheet 1
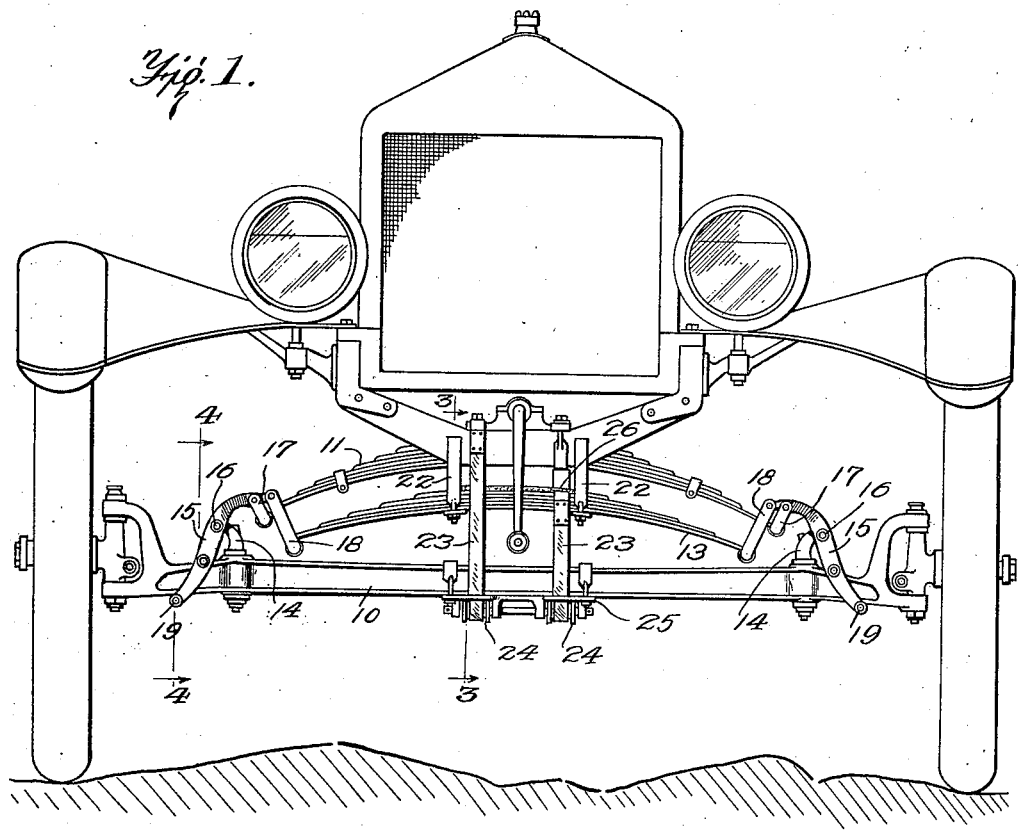
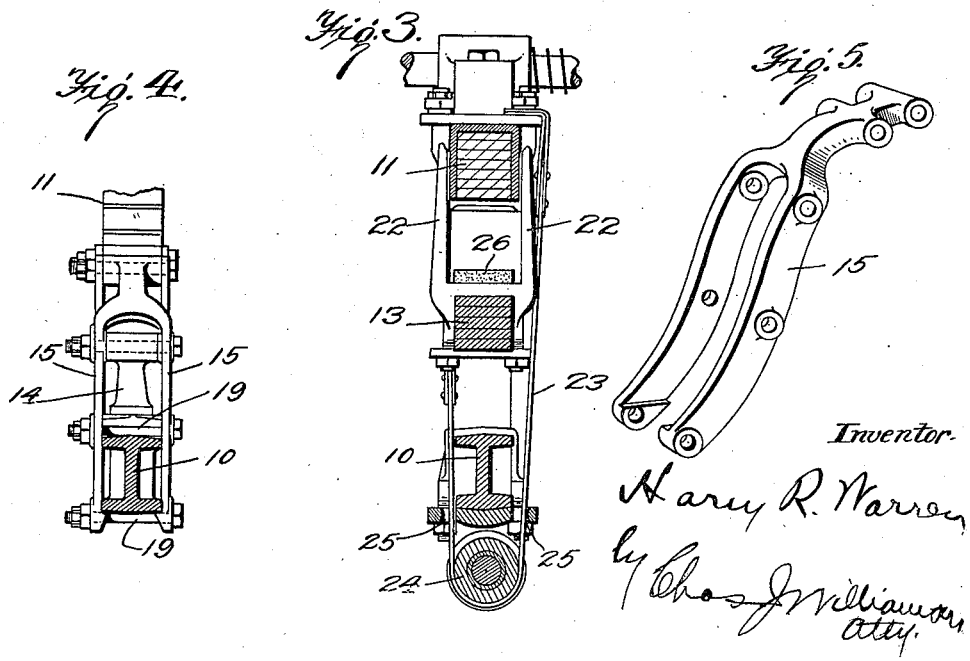
Inventor.
Harry R. Warren
by Chas. J. Williamson
Atty.

May 22, 1923.
H. R. WARREN
1,456,410
SPRING FOR AUTOMOBILES
Filed Aug. 19, 1921    2 Sheets-Sheet 2
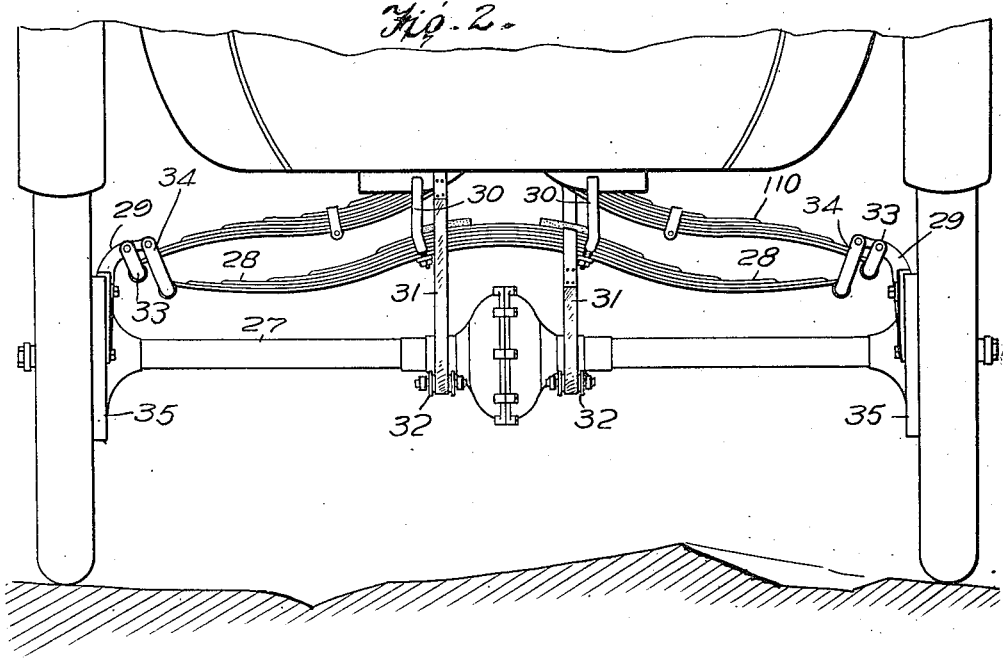
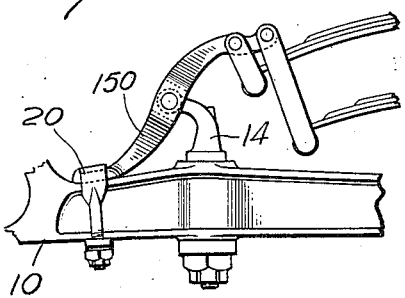
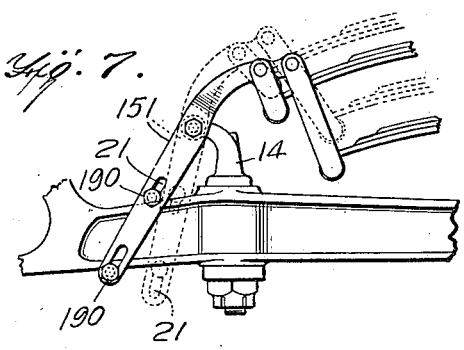
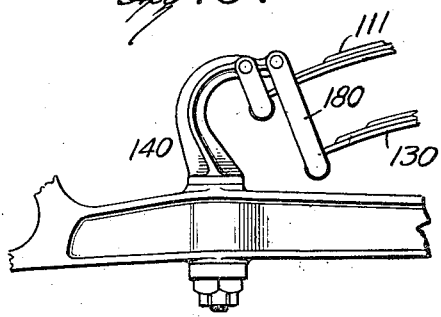
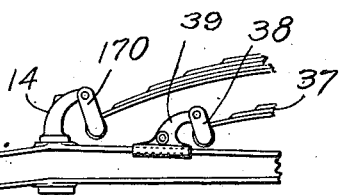
Inventor
Harry R. Warren
By Chas. J. Williamson
Attorney Patented May 22, 1923.

1,456,410

UNITED STATES PATENT OFFICE.

HARRY R. WARREN, OF WABUSKA, NEVADA.

SPRING FOR AUTOMOBILES.

Application filed August 19, 1921. Serial No. 493,739.

*To all whom it may concern:*

Be it known that I, HARRY R. WARREN, residing at Wabuska, county of Lyon, State of Nevada, a citizen of the United States, have invented certain new and useful Improvements in Springs for Automobiles, of which the following is a specification.

As is well known, the spring arrangement of the Ford cars and trucks as the same are turned out from the factory, is unsatisfactory because with a light load the stiffness of the springs is such that riding is uncomfortable, and with a heavy load, and such a load as the strength of the cars permits, the springs of the car are depressed to an extent that exposes them or other parts of the car to danger of breakage from the collisions that may take place between the springs and the axle. Attempts have been made to solve the problem thus presented by substituting stiffer springs than those with which the car or truck is originally provided, and while that to some extent meets the above described consequences of a heavy load, it is not satisfactory because with a light load the stiffer springs do not possess the resiliency needed for comfortable riding. Equipped with its original springs the Ford car is not only open to the objections just mentioned, but the necessity for slowing down to ride over bumpy or rough road diminishes speed of travel, diminishes the gasoline mileage, and throws undue wear on the brakes. Again, excessive vibration which takes place with the original spring equipment produces contact of the fenders and the tires to the injury of the tires. The object of my invention is to overcome or remove these serious objections to the Ford car, and I do this by providing a spring arrangement that is supplemental to the original spring equipment, which besides achieving the important results indicated can be applied to the car without any disturbance whatever of the original spring equipment and which will not only not weaken or impair the strength of the axles but, in fact, will be an element of strength. While my invention has been made with especial reference to Ford cars and trucks, I, of course, do not restrict myself only to that particular automobile.

In the accompanying drawings:

Fig. 1 is a front elevation of a Ford automobile embodying my invention;

Fig. 2 is a rear elevation;

Fig. 3 is a section on the line 3—3 of Fig. 1;

Fig. 4 is a section on the line 4—4 of Fig. 1;

Fig. 5 is a detail view in perspective of the spring supporting arm shown in Figs. 1 and 4;

Figs. 6, 7, 8 and 9 are detail views of various devices for attaching the main and supplemental springs to the front axle.

Put briefly, my invention contemplates the employment of a spring, preferably a semi-elliptic leaf-spring, between the usual semi-elliptic leaf-spring with which the car is originally equipped and the axle, the supplemental spring being attached at its extremities to the axle at the outer ends thereof and sufficient space being left between the two springs at the center to allow vibration of the original spring under limited light loads without contact with the lower spring, such contact only taking place under the heavier loads. Thus under the light loads, only the upper spring is called into action and riding is comfortable for the passengers forming a light load, while under heavier loads both springs by their contact are called into action and comfortable riding for heavier loads is assured, but danger of unduly stressing the springs or breakage of parts is avoided.

Referring in detail to what is shown in the drawings, 10 designates the front axle of the Ford car, 11, the original semi-elliptic spring secured at its ends by bolts, 14, to the outer ends of the axle, and 13 is my supplemental elliptic leaf-spring arching up from the axle and normally being spaced below the original spring, 11, and above the axle and at each end being attached to the outer end of the axle. The attachment of the springs to the axle may be accomplished in various ways, some of which are shown in the drawings. I prefer a means of attachment which will involve discarding no parts whatever of the original construction of the car, and a minimum of additional parts. Thus, as shown in Figs. 1, 6, and 7, I use the bolt, 14, employed in the original construction of the car, for the attachment of the original semi-elliptic spring, 11, turning it around, however, 180° from its original position and disconnecting the eye at the end of the spring, 11, from said bolt, and providing an arm, 15, which besides being attached to said bolt, 14, by a bolt, 16, which passes through the eye thereof, is attached both to the front axle, 10, and to the eye at the end of the original semi-elliptic spring, 11, by means of a link, 17. I also attach to said arm, 15, the end of my supplemental spring by means of a link, 18, which straddles or through which passes the adjacent portion of the main spring, 11, so that both the main and the supplemental spring are suspended by pivoted links from the upper end of the arm, 15. An important result from the arrangement just described which includes turning the original bolt, 14, through 180° from its original position and the employment of the arm, 15, is that the main spring, 11, is supported higher from the axle than in its original construction, and hence ample room is afforded for an efficient supplemental semi-elliptic spring in accordance with my invention.

As shown in Figs. 1 and 5, the arm, 15, is forked to straddle the axle, and above and below the latter a bolt, 19, passes through alining holes in the two forks, a construction being thus afforded of great strength and stiffness.

As shown in Fig. 6, the arm, 150, corresponding in function to the arm, 15, is not forked but rests upon the top of the axle, 10, an ordinary clip bolt, 20, being used to rigidly clamp the arm to the axle. In all other respects the construction is the same as that shown in Fig. 1. As shown in Fig. 7 the construction is the same in all substantial respects as that shown in Fig. 1 excepting the slots, 21, are provided in the arm, 151, through which the bolts, 190, pass, said slots enabling shifting of the position of the arm, 151, to compensate for flattening of the springs in use so as to lift the springs further from the axle, the arm, 151, being shiftable, for example, to the position shown in dotted lines in Fig. 7.

In the embodiment of my invention shown in Fig. 8 no arm corresponding to the arm, 15, is used, but a bolt, 140, is employed which is substituted for the original bolt, 14, and provided with an extra eye for the attachment of the link, 180, that straddles the main spring, 111, and pivotally supports one end of the supplemental spring, 130.

Preferably to keep the two springs in alinement while allowing free vertical movement or play, a forked arm, 22, clipped, say to the lower spring at the center portion, straddles the upper spring.

I also prefer to connect the main and the supplemental springs together by a pair of flexible straps or bands, 23, the ends of each of which are respectively attached to the two springs at their central portions and which are passed beneath the axle and each preferably over a roller, 24, secured to the underside of the axle. Thus when the upper or main spring rebounds after compression, through the strap connections a downward pull will be exerted on the supplemental or lower spring, and thus the rebound diminished and a shock absorbing action will be secured. Each band, 23, at both sides of the roller passes through a guide, 25, to keep it from sliding sidewise on the roller.

If desired a block, 26, of rubber may be applied to the top of the supplemental spring so that should the two springs come together, the blow will be cushioned. Of course, such a block could be placed on the underside of the main or upper spring.

The spring arrangement at the back of the car is similar to that of the front, it comprising the original semi-elliptic leaf-spring, 110, secured at its ends to the rear axle, 27, a supplemental semi-elliptic leaf spring, 28, situated between the axle end of the main spring and attached at its ends to the rear axle by brackets, 29, spring guiding arms, 30, and connecting bands, 31, which pass over rollers, 32, on the underside of the rear axle, being provided. A single bracket, 29, serves for suspending both of the rear springs, the main spring being suspended by a link, 33, and the supplemental spring by a link, 34, therefrom, which straddles the main spring and the bracket being bolted to the rear axle hub, 35. Thus a simple, inexpensive, and yet strong attachment of the two springs is afforded.

Instead of having both the main and the supplemental springs supported by a single bracket at each end, each, as shown in Fig. 9, may have its own bracket, the main spring in such case being attached by a link, 170, to the original bolt, 14, in its original position, and the supplemental spring, 37, being attached by a link, 38, suspended from a separate bracket, 39, clamped to the axle. By the arrangement shown in Fig. 9, any flattening of the supplemental spring, 37, that may occur may be compensated for by adjusting the brackets, or clips, 39, at each end towards one another.

It is an important feature of my invention that the supplemental spring is attached or connected to the axle at or near the outer ends thereof as thereby the axle is better able to resist the extra load applied thereto by the supplemental spring under conditions of heavy load which call such spring into action.

While I prefer the semi-elliptic leaf-spring as the supplemental or auxiliary spring, it is to be understood that my invention in its broadest aspect is not limited to such a type of spring; and it is to be understood that in regard to the means of attaching the supplemental spring even when it is in the form of a semi-elliptic leaf-spring, my invention is not limited to the particular attaching arrangements shown.

What I claim is:

1. The combination of a vehicle axle, a plurality of leaf-springs normally spaced from one another and from the axle, and a single connection between the like ends of the springs and the axle, at each end thereof, comprising an arm attached to the axle and extending upward therefrom and a perch to which said arm is secured above the axle.

2. The combination of a vehicle axle, a plurality of leaf-springs normally spaced from one another and from the axle, a single connection between the like ends of the springs and the axle, at each end thereof, comprising an arm secured to the axle, links between the arm and the spring ends, and a perch on the axle to which said arm is attached at a point between the axle and the links.

In testimony whereof I hereunto affix my signature.

HARRY R. WARREN.